No. 813,361. PATENTED FEB. 20, 1906.
A. S. DENNIS.
ADDING AND RECORDING MACHINE.
APPLICATION FILED FEB. 20, 1905.

WITNESSES: INVENTOR.
Adolphus S. Dennis
BY
ATTORNEY.

No. 813,361. PATENTED FEB. 20, 1906.
A. S. DENNIS.
ADDING AND RECORDING MACHINE.
APPLICATION FILED FEB. 20, 1905.

WITNESSES:
AN Moser.
TC Billmoser

INVENTOR.
Adolphus S. Dennis
BY H J Fisher
ATTORNEY.

No. 813,361. PATENTED FEB. 20, 1906.
A. S. DENNIS.
ADDING AND RECORDING MACHINE.
APPLICATION FILED FEB. 20, 1905.

WITNESSES:

INVENTOR.
BY
ATTORNEY.

No. 813,361. PATENTED FEB. 20, 1906.
A. S. DENNIS.
ADDING AND RECORDING MACHINE.
APPLICATION FILED FEB. 20, 1905.

WITNESSES:

INVENTOR.
BY H J Fisher
ATTORNEY.

No. 813,361. PATENTED FEB. 20, 1906.
A. S. DENNIS.
ADDING AND RECORDING MACHINE.
APPLICATION FILED FEB. 20, 1905.

WITNESSES:

INVENTOR.
Adolphus S. Dennis
BY H. J. Fisher
ATTORNEY.

UNITED STATES PATENT OFFICE.

ADOLPHUS S. DENNIS, OF CLEVELAND, OHIO.

ADDING AND RECORDING MACHINE.

No. 813,361.    Specification of Letters Patent.    Patented Feb. 20, 1906.

Application filed February 20, 1905. Serial No. 246,430.

*To all whom it may concern:*

Be it known that I, ADOLPHUS S. DENNIS, a citizen of the United States, residing at Cleveland, in the county of Cuyahoga and State of Ohio, have invented certain new and useful Improvements in Adding and Recording Machines; and I do declare that the following is a full, clear, and exact description of the invention, which will enable others skilled in the art to which it appertains to make and use the same.

My invention relates to adding and recording machines, and is an improvement in like machines patented by me, and more particularly in the machine described in Letters Patent of the United States dated April 26, 1904, No. 758,052; and the improvement consists in the arrangement and combination of parts substantially as herein shown and described, and more particularly pointed out in the claims.

Heretofore the operation of the machines invented by me were dependent upon the power of the operator alone and the various actuating parts were set and manipulated by hand. In the present construction my object is to provide power-driven mechanism to positively actuate the parts through the intervention of releasing-key levers which are merely adapted to select and set the power-driven parts in motion and which in themselves require no undue pressure, but only a slight touch to depress the same.

My aim as set forth in simple detail is, first, to move the paper-carrier mechanically a predetermined distance by the depression of any one of a series of designating key-levers, and, second, to set in motion the mechanically-driven actuating parts for the adding and recording mechanism by depressing any one of a series of key-levers representing the digits and the like.

In the accompanying drawings, Fig. 7 is a central vertical sectional view of the machine on line $v\ v$, Fig. 9.

Figure 4:
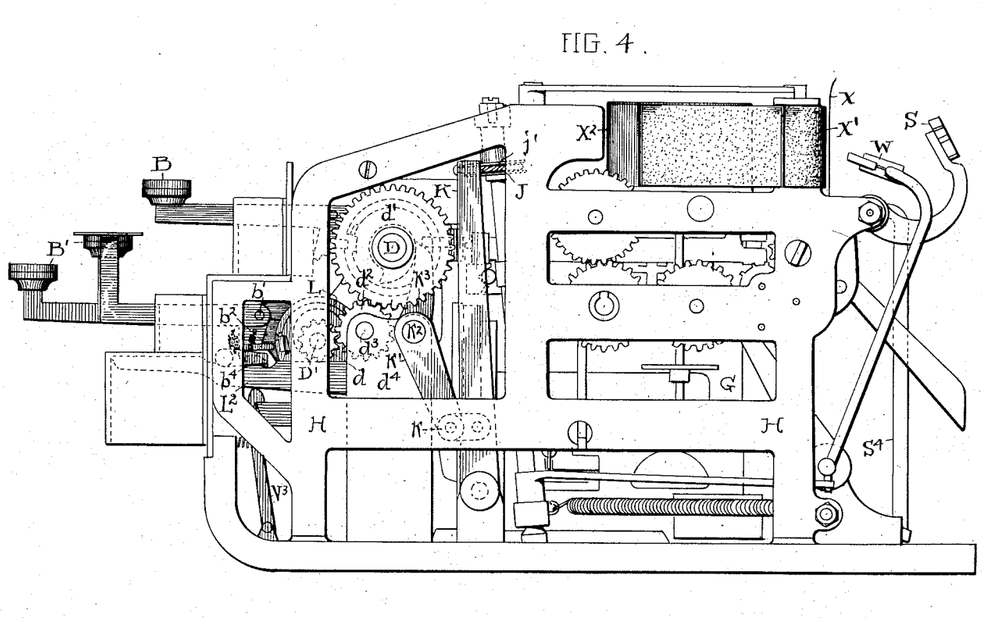
Fig. 4 is a side elevation of the machine.
Figures 5, 6:
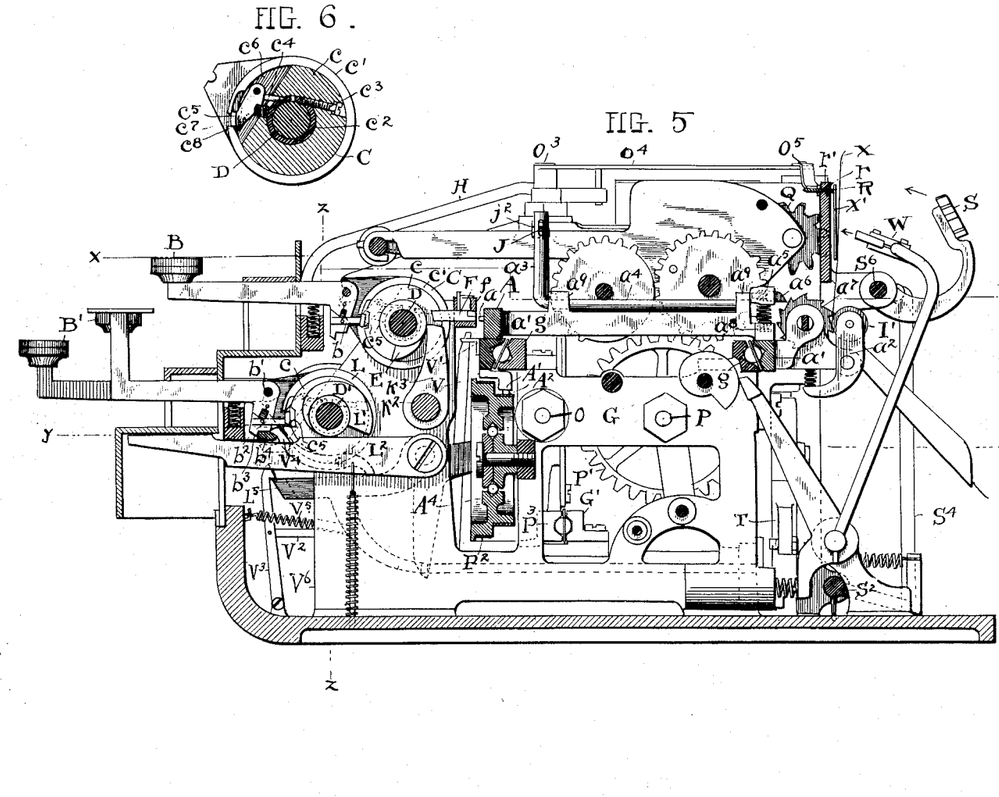
Fig. 5 is a vertical section front to rear on line $u\ u$, Fig. 9.
Fig. 6 is an enlarged sectional detail of one of the key-lever friction-clutches as at rest.
Figure 8:
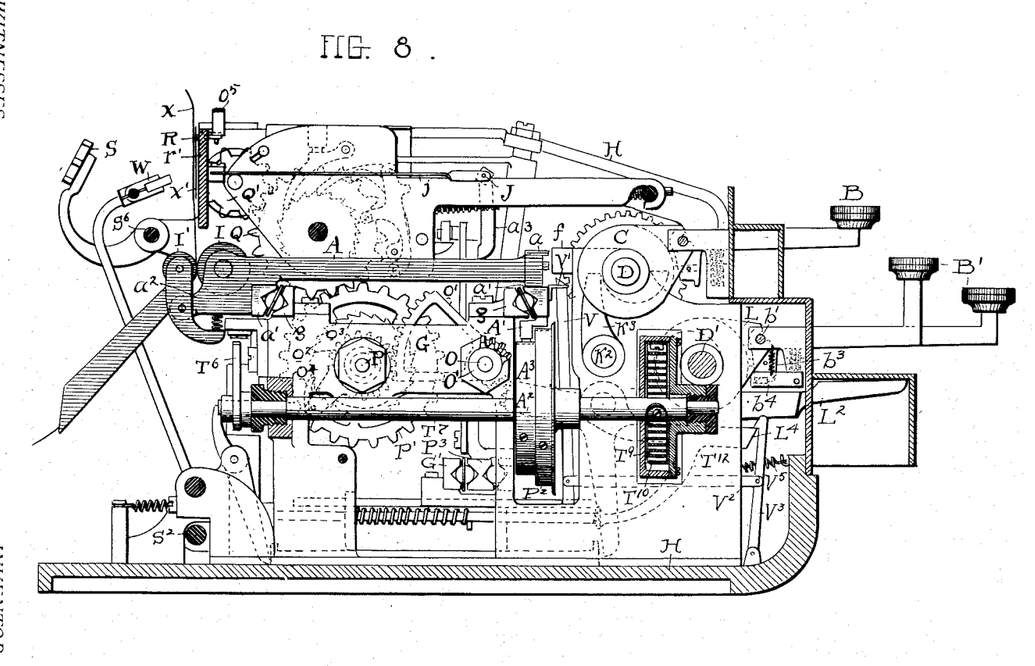
Fig. 8 is a similar vertical section taken on line $t\ t$, Fig. 9, but looking in the opposite direction and from the opposite side of the machine.

All of the views above described show the machine in a position of normal rest or prior to setting it for adding and recording any specified item. The first step in printing an item is to move and set the paper carrier or carriage (represented by A) to a predetermined position corresponding to the number of figures in the item, and this is accomplished in my present construction by depressing the proper one of a series of keys B, arranged in a row or tier at the top and front of the machine. Each key B when actuated throws in a friction-clutch C, mounted on shaft D, which is under constant rotation from power derived from main shaft D' through pinion $d$ on shaft D', a gear-wheel $d'$ on shaft D, and intermediate pinion $d^2$, mounted on a short shaft $d^3$ on standard $d^4$, Fig. 4. Each clutch C is adapted to make one complete revolution and then stop and occupy the same relation and position as before, and a cam of a series of cams E of different camming action, is attached to each clutch member C and serves to not only move carriage A by means of a suitable train of mechanism, but also acts to throw out a sliding stop F in the path of fingers $a$ on carriage A, Figs. 5 and 7, to limit its travel to correspond to the key depressed and the number of figures in the item to be recorded.

Figure 1:
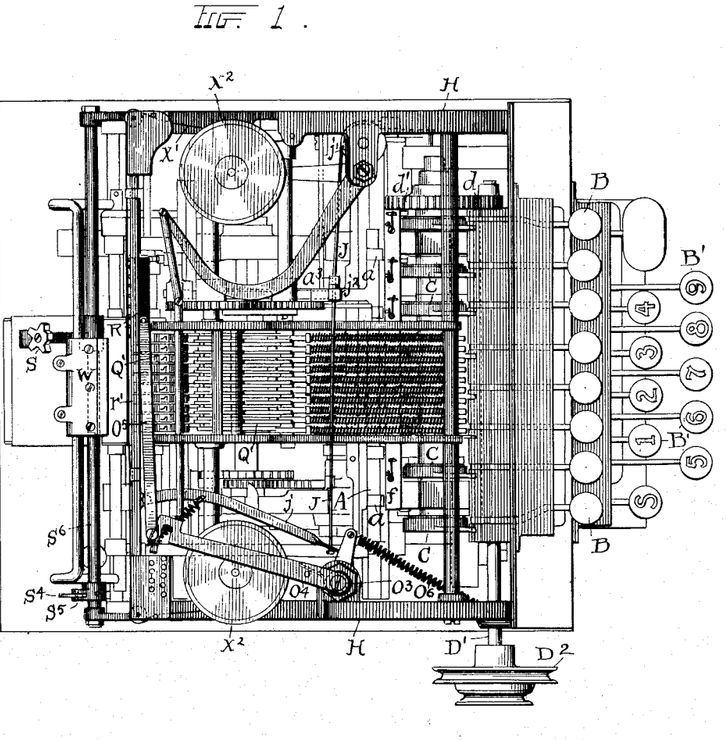
Figure 1 is a plan view of my improved machine.
Figure 2:
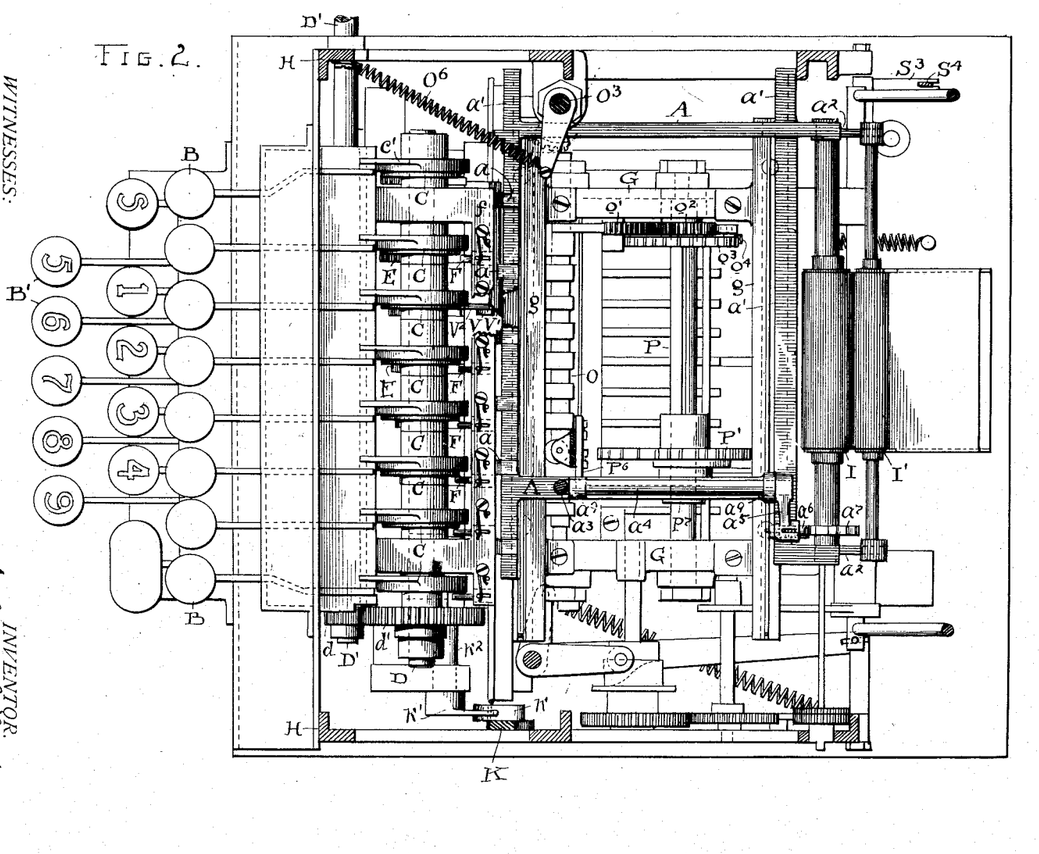
Fig. 2 is a similar view enlarged and in section on line $x\ x'$, Fig. 5.

Carriage A is supported to travel on ball-bearings running in races or grooves of bars $a'$ front and rear, forming part of said carriage, and in grooved bars $g$, forming part of an inner frame G of main frame H of the machine. At the rear end of carriage A and journaled in brackets or extensions $a^2$ thereon is a set of rubber feed-rollers I I', adapted to hold and feed the paper strip X, upon which the items are to be printed. It will be understood in this connection that as carriage A is moved from starting position the paper strip X is fed upward a definite distance to space the items to be printed beneath previously-printed items and in columns, and this result is obtained by an initial pull upon upright arm $a^3$ of rock-shaft $a^4$, which is journaled in lugs or ears $a^9$ on carriage A, and which shaft has an arm $a^5$ with a spring-pressed pawl $a^6$, adapted to engage ratchet-wheel $a^7$ of feed-roller I to rotate the same, Figs. 2 and 5. The rock movement imparted to rock-shaft $a^4$ is limited by arm $a^5$ striking stop $a^8$ and is preliminary to the movement of the carriage, all of which is brought about by a cord or cable J, stretched over the top of the machine and attached at one end to a horizontally-arranged pivoted controlled arm $j$, Fig. 9, and at the other end to the free end of an upright pivoted lever K, Figs. 2 and 4, the cord or cable passing around a pulley $j'$, mounted on frame H, Fig. 4, and having a button or engaging member $j^2$, Fig. 9, adapted to bear against arm $a^3$. Lever K is connected near its lower end by link $k$ to a rock-arm $k'$, Fig. 4, fastened upon the end of cross-shaft $k^2$, which carries a series of upright arms $k^3$, one for each cam E, Figs. 5 and 7, and adapted to be engaged thereby to rock shaft $k^2$ whenever one of the several friction-clutches C is thrown into action. All of the clutch members C are alike, and a description of one will suffice for all. Thus, referring to Figs. 6 and 9, it is seen that each clutch member comprises a ring or disk $c$, mounted to revolve within a fixed casing $c'$ and having a split ring $c^2$ centrally within and surrounding shaft D. One end of ring $c^2$ is engaged by set-screw $c^3$ and the other end by a pin or plunger $c^4$, which bears at its outer end against a spring-pressed pawl or dog $c^5$, pivotally mounted within slot $c^6$ of disk $c$. The rim or flange of casing $c'$ is notched or recessed at $c^7$ to permit the free end of dog $c^5$ to press outward and to rest therein and engage shoulder $c^8$ and keep disk $c$ from revolving and to limit it to one revolution for each actuation of its operating key-lever B. Each lever B is provided with a spring-controlled finger $b$, Fig. 5, adapted to bear against the free end of dog $c^5$, and when said key-lever is depressed dog $c^5$ is forced inward and plunger $c^4$ clamps split ring $c^2$ upon shaft D and causes disk C to make one complete revolution. Cam E, attached to one side of disk $c$, revolves with it and throws arm $k^3$ back, and thereby moves carriage A through the intermediate mechanism, as hereinbefore described. To stop carriage A at predetermined places corresponding to the selected key-levers B, each cam E is adapted to bear against a spring-compressed sliding stop F, mounted opposite thereto within a cross-bar $f$, Fig. 5, and which stop when engaged is thrown out in the path of projections or fingers $a$, arranged in staggered relation on carriage A, so that each stop has its own engaging finger $a$ and all are differently related to limit the travel of the carriage to varying distances.

Figure 3:
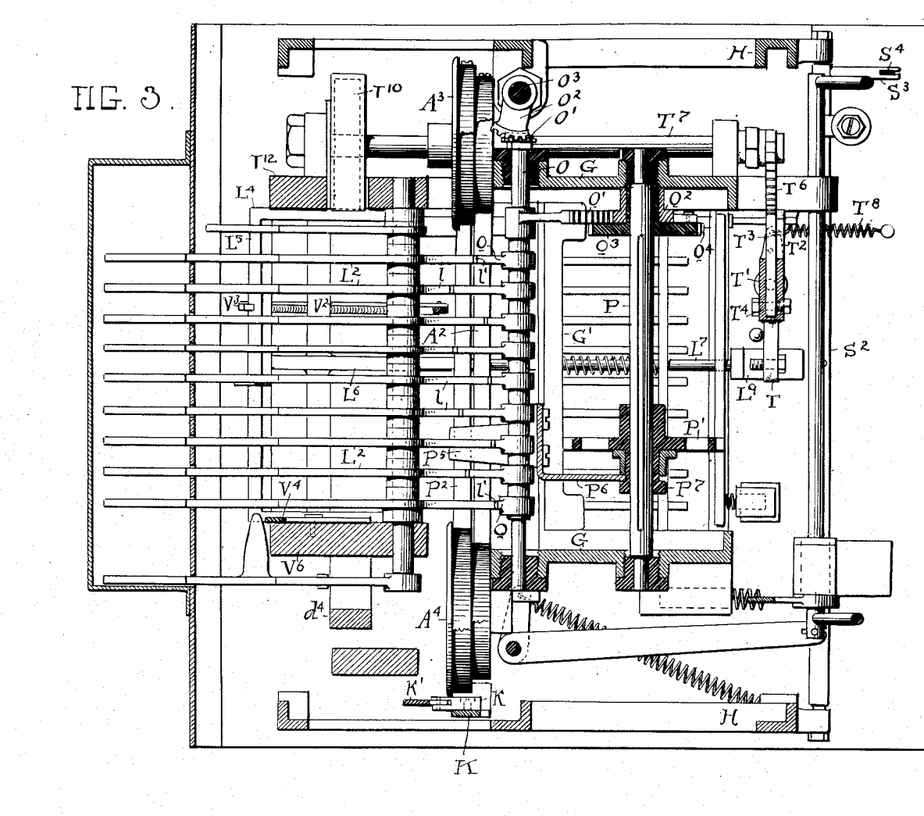
Fig. 3 is also a sectional plan view on line $y\ y$, Fig. 5, and on a still lower plane than Fig. 2.
Figure 11:
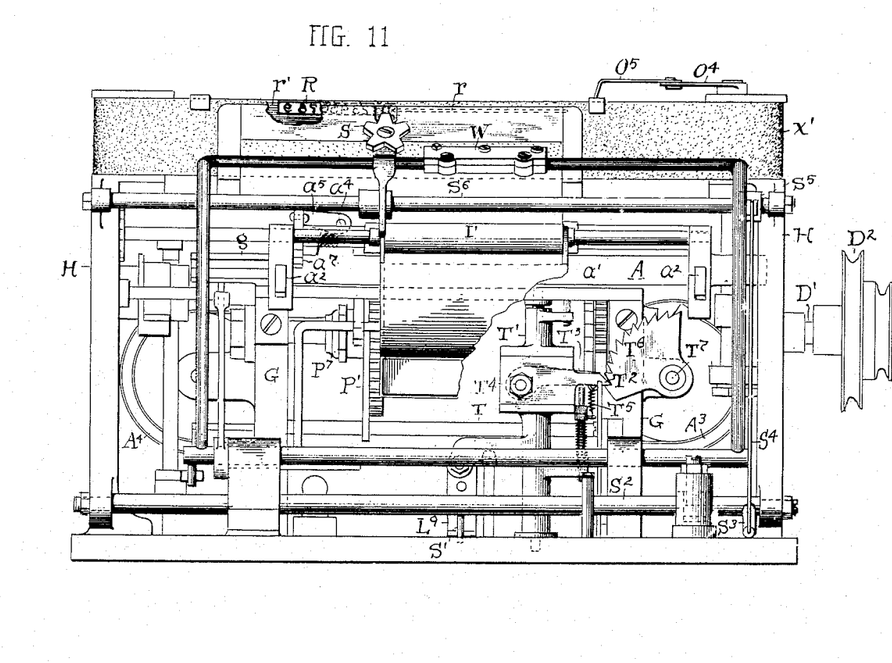
Fig. 11 is a rear elevation of the machine.

Having taken the first step by depressing one of the key-levers B, and thereby causing carriage A to take its selected place, the second step in the operation of the machine consists in selecting and depressing one of the ten key-levers B' which represent the digits and naught and which are located immediately below and in advance of levers B. Levers B' are pivotally supported upon a cross-rod $b'$ and have a right-angled portion provided with a trigger or finger $b^2$, Fig. 5, and a notched extremity $b^3$. A pivoted cross-plate $b^4$, suitably spring-controlled, engages each extremity $b^3$ and locks each lever against movement when carriage A is in its initial starting position, but releases the same when the carriage is operated, as will appear later. Each lever B' has a friction-clutch member L, corresponding in every detail to clutches C, and like letters of reference are used for the detail construction of both series of clutches, Fig. 9. Clutch members L are also provided with cams L', which bear against corresponding pivoted levers $L^2$ and serve to depress their free ends when a corresponding lever B' is depressed and its clutch L thrown into action for one complete rotation, as is the case with clutches C, Fig. 7. This action results in printing the numeral selected upon paper strip X, carried by carriage A, and also results in adding the amount represented to previously-recorded items on totalizing printing-wheels N. A further effect is to release carriage A to return to starting position by a step-by-step movement as each item is set down. The mechanism for obtaining these results comprise actuating rack-levers $L^2$, having projecting arms or fingers $l$, Fig. 7, at the rear of their pivot and with rack-teeth $l'$ at their ends which engage teeth on segments $o$ of a cross-shaft O, having bearings in frame G, Fig. 3. Shaft O is rocked or rotated varying degrees, dependent upon the lever actuated and which is provided for by having arms or fingers $l$ of the different levers L of different lengths and each toothed segment $o$ of such length as to be engaged thereby, Fig. 9. Each lever $L^2$ is independently operated, and the teeth of arms or fingers $l$ and segments $o$ are normally out of mesh to permit the rotation of shaft O by any one of levers $L^2$. At one end of shaft O is a small bevel gear or segment O', Fig. 3, meshing with a like gear or segment $O^2$ on vertical shaft $O^3$, having bearings in frame H. At the upper end of shaft $O^3$ is an arm $O^4$, Fig. 7, projecting to the rear of the machine, and with a connecting-link $O^5$ at its end which is attached to sliding type-bar R, mounted in slot $r$ of cross-plate $r'$, Fig. 11. Bar R is provided upon its rear face with a line of type representing the digits and naught and is normally at rest with naught opposite hammer S, Fig. 11. When a lever B' is depressed, the corresponding number represented by said lever is brought opposite hammer S, the varying degree of sliding movement imparted to type-bar R being obtained by the varying degree of rock movement imparted to shafts O and $O^3$ by rack-levers $L^2$. A spring $O^6$, Fig. 2, attached to an arm on shaft $O^3$ and frame H, returns the parts to the same starting position after each actuation. Hammer S is also actuated in proper time for printing the numeral brought forward on type-bar R, and this occurs through the medium of a pivoted yoke $L^4$, having a cross-piece $L^5$, Fig. 3, arranged beneath the row of levers $L^2$ and adapted to be engaged thereby and to be pressed downward when any one of said levers is actuated. A rearwardly-curved arm $L^6$, Fig. 7, depending from yoke $L^4$, is adapted to engage a spring-pressed sliding rod $L^7$, supported above the base-plate of the machine upon cross-pieces $L^8$. Rod $L^7$ has an L-shaped head $L^9$ at its rear, with a lip or extension which is adapted to strike pin S', depending from cross-shaft $S^2$, supported to rock in bearings at the rear of frame H. A rearwardly-extending arm $S^3$ of shaft $S^2$ is connected by link $S^4$ with crank-arm $S^5$ on cross-shaft $S^6$ at the top of the machine and which supports hammer S. Thus when yoke $L^4$ is depressed hammer S is thrown forward by the several related parts, as described. The movement of yoke $L^4$ and sliding rod $L^7$ and its head $L^9$ is further utilized to cause a return action of carriage A step by step or by degrees after each depression of a lever B' and $L^2$. This is, in effect, a spacing of the carriage to bring the successive columns of figures on the printing-slip in line with the separate figures of the item to be printed. Thus as head $L^9$ moves to the rear it engages a set-screw in the end of arm T on a vertically-pivoted post T' and rotates the same on its pivot. Said post carries a set of fingers on its opposite side, one finger $T^2$ being fixed and the other finger $T^3$ pivoted at $T^4$ and having a spring $T^5$, attached to pull said latter finger down when disengagement is effected from ratchet-wheel $T^6$ on horizontal shaft $T^7$. Then as spring $T^8$, attached to one side of post T', rotates said post to original position finger $T^3$ engages a different tooth on ratchet-wheel $T^6$ and permits shaft $T^7$ to rotate partially under its own spring control, which is embodied in a spiral spring $T^9$, inclosed within casing $T^{10}$, attached to standard $T^{12}$ at the front of the machine. Carriage A is attached at A' to a flexible steel tape $A^2$, which stretches from side to side of the machine and passes around suitable drums $A^3$ and $A^4$, respectively, drum $A^3$ being mounted on shaft $T^7$ and having tape $A^2$ fastened thereto. This completes the train of parts which control the movement of carriage A.

Figures 9, 10:
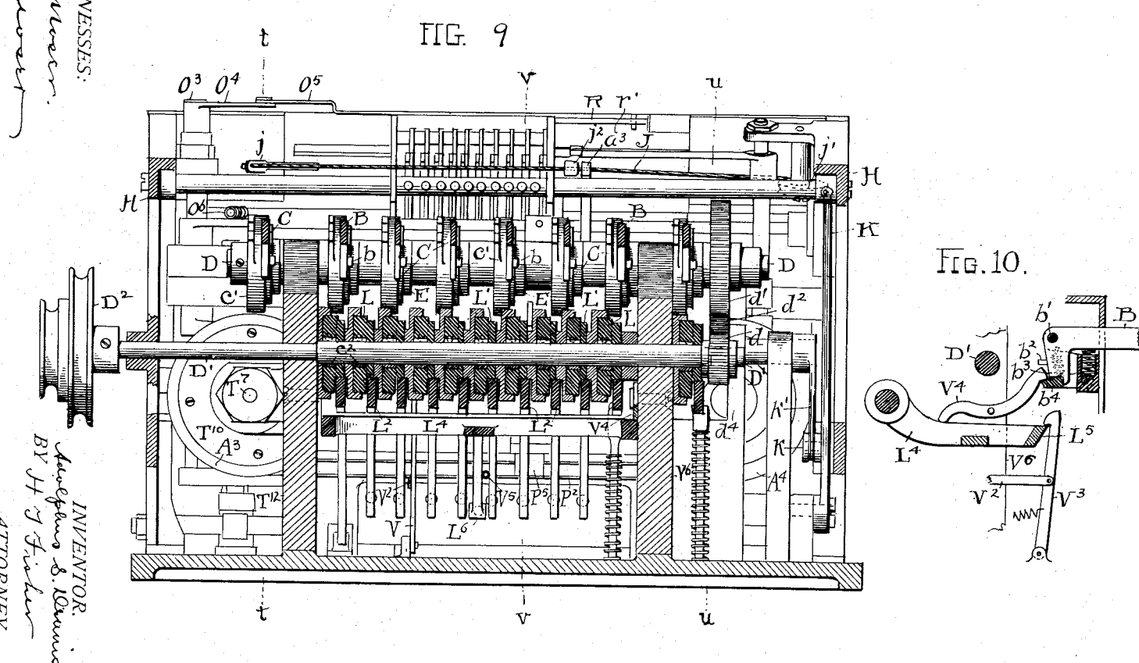
Fig. 9 is a vertical cross-section on line $z\ z$, Fig. 5, looking toward the rear.
Fig. 10 is a detail view showing the releasing-finger for the locking-bar of the numeral-key levers.

Now referring more particularly to the adding mechanism, whereby the total of any series of printed items is obtained and recorded, I further utilize rock-shaft O by mounting a segmental gear o' thereon to actuate a segmental pinion $o^2$, sleeved to rotate on the hub of ratchet-wheel $o^3$, which is fastened upon a cross-shaft P, supported in bearings of frame G. A pawl $o^4$ on pinion $o^2$ engages ratchet-wheel $o^3$ and rotates the same and also shaft P as much as is imparted through gear o' and rock-shafts O. A like rotation is thereby imparted to a selector-gear P' free to slide but splined upon shaft P, and gear P' transmits its rotation to any one of the several gears Q in the bank of gears for the adding mechanism proper and which are completed by the totalizing-gears Q' in mesh with gears Q. This adding mechanism is fully described and shown in my former Letters Patent, and hence a detailed description thereof is not entered into herein. Suffice to say, that as each lever B' is actuated the numeral represented thereby is added to the totalizing-gears Q' and as operated by gear P' and gear Q. Each movement of carriage A is followed by a like movement of selector-gear P', excepting that it is in a reverse direction and as produced by a second metallic tape $P^2$, attached to drum $A^3$ and which also passes around drum $A^4$ and back. A movable bar $P^3$, supported to travel on ball-bearings within a guiding-frame portion G" of frame G, has an arm attached to tape $P^2$ at $P^5$, and said bar carries a vertical plate with a right-angled arm $P^6$, slotted at its end and engaged with an annular groove in the hub $P^7$ of gear P'. Thus as carriage A moves selector-gear P' also moves, but in the opposite direction, and engages first one and then another of the gears Q, according to the column represented by the items being printed. Upon the initial movement of carriage A a series of connected members are thrown into action to release the locking-bar $b^4$ for key-levers B', so that they may be actuated. This mechanism comprises a vertically-arranged trip-lever V, pivoted at its lower end to an ear on the base of the machine and having engagement at its upper free end with a projecting lip V', mounted on bar a' of carriage and beveled at one end to ride and force said lever back when carriage A is first moved. A link $V^2$ connects with lever V above its pivot and is attached to a second pivoted lever $V^3$, which has a hook or catch at its upper free end, which engages and holds yoke $L^4$ a short distance apart from rack-levers $L^2$ until carriage A moves. As seen in Fig. 10, a short trip or finger $V^4$, pivoted at its center upon standard $V^6$, has one end bearing against yoke $L^4$ and its other end projecting over lock-bar $b^4$, so that as said yoke is released from catch-bar $V^3$ and is raised by the tension of spring $V^5$, attached to arm $L^6$, said finger $V^4$ is actuated and lock-bar $b^4$ depressed to release key-levers B'. With this construction it is imperative that the operator shall first actuate levers B to set the carriage before levers B' can be depressed to throw the adding and printing mechanism into action.

I employ the same mechanism for printing as in my former machines, a total-striking hammer W being used to print the total upon paper strips X through the medium of a suitable printing-ribbon X', stretched across the face of cross-plate r' and adapted to be wound upon spools X².

Power is applied to main drive-shaft D' through the medium of a pulley D², fastened thereon at one end, and in operation said shaft is under constant rotation.

A brief summary of the various operations of my improved machine discloses that a mere touch of the operator upon any one of the series of related keys B will automatically set carriage A at any predetermined place in the line of travel of said carriage and corresponding to the value of the key actuated, that upon a depression of any one of a second set of keys B', representing the digits and naught, the value of a key depressed is automatically printed upon a slip of paper carried by said carriage and in column formation thereon, and said carriage is automatically returned a step from its set position, and at the same time the value of the key depressed is automatically recorded or added to a set of totalizing-wheels, from which the total of all items set down upon the paper strip may be printed. A slight depression of keys B and B' is all that is necessary to throw in the clutch members C and L, respectively, and as the balance of the mechanism is power-driven all other actuations are mechanical, and the degree of force imparted to the mechanism is always the same and equal, and the throw of the various parts also always the same and equal. With my improved machine I gain not only a high speed of operation, but also equalize the strain and shock upon all the mechanism, and thereby prolong the life of the machine, as well as to produce a uniform character of work.

What I claim is—

1. In an adding and recording machine, mechanism adapted to add, combined with mechanism adapted to print, power means for automatically operating said mechanisms jointly and simultaneously, keys to throw said power means into action, carrying and feeding means for the paper printed on, and automatic power mechanism adapted to operate said carrying and feeding means.

2. In an adding and recording machine, adding mechanism and printing mechanism, and power means providing variable actuation of both said mechanisms, a movable feed-carriage for the paper and power actuating mechanism adapted to regulate the movement of said carriage in opposite directions, a series of selector-key levers for said adding and printing mechanism, and a series of selector-key levers for said carriage.

3. In an adding and recording machine, adding-wheels and printing means and mechanism to actuate the same, and a movable carriage for the paper printed on, in combination with mechanism adapted to automatically actuate said carriage in reverse directions, and separate sets of key-levers for throwing said adding and printing mechanism and said carriage-actuating mechanism into action.

4. In an adding and recording machine, adding-wheels and printing mechanism and a movable carriage for the paper printed on, in combination with means to actuate said wheels and mechanism, mechanism adapted to automatically move said carriage in opposite directions, different sets of keys to throw said adding-wheels and printing mechanism and said carriage mechanism into action, and a power-driven shaft and clutch connections thereon operatively connected with said key-levers.

5. In an adding and recording machine, separately-mounted adding-wheels and mechanism for operating the same, a shaft and clutches thereon adapted to operate said mechanism, and a series of key-levers to throw said clutches into action, in combination with mechanism adapted to print from said wheels.

6. In an adding and recording machine, adding-wheels and actuating mechanism therefor comprising variable-throw members and cam and lever means for operating the same, a revolving shaft and key-controlled means for throwing said parts into action by means of said shaft.

7. In an adding and recording machine, adding-wheels and means to operate the same comprising rack and lever members for producing a variable throw, cams and friction-clutches to actuate said members, key-controlling means for said clutches, and a power-shaft for said clutches.

8. In an adding and recording machine, printing mechanism, a movable carriage to carry the paper for printing, automatic means for setting said carriage at predetermined places, power mechanism for throwing said means into action, and keys with which said power mechanism has mechanical connections.

9. An adding and recording machine provided with printing means, a movable carriage for the paper printed on, power means to automatically move said carriage in opposite directions, and keys for controlling the movement of said carriage in each direction.

10. In an adding and recording machine, printing and adding mechanism, and a movable carriage for the paper, in combination with a power-driven shaft, actuated means for setting said carriage at predetermined places and operating-keys for throwing said means into action, and operating-keys for said printing and adding mechanism.

11. In an adding and recording machine, adding and printing mechanism, a movable carriage for the paper and power-actuated means for setting said carriage at varying distances from the starting-point, in combination with a set of keys for controlling the setting of said carriage, and a set of keys for controlling said adding and printing mechanism.

12. In an adding and recording machine, adding and printing mechanism, a movable carriage for the paper, power-actuated means for setting said carriage at predetermined places, a set of key-levers for controlling said power-actuated means, power-driven mechanism for said adding and printing mechanism, and a set of keys for controlling the action of said power-driven mechanism.

13. In an adding and recording machine, adding and printing mechanism, a movable carriage and mechanism for operating the same, a power-shaft and means connected therewith to actuate said adding and printing mechanism and said carriage-operating mechanism, and keys for throwing said means into action.

14. In an adding and recording machine, adding-wheels and printing mechanism and a movable carriage for the paper, a train of actuating mechanism for said wheels, said printing mechanism and said carriage, a revolving shaft and friction-clutches thereon adapted to operate said train of mechanism, and a series of keys adapted to throw said clutches into action.

15. In an adding and recording machine, adding-wheels and printing mechanism and actuating means therefor comprising variable-throw members and cam and lever means for operating the same, a movable carriage for the paper and means for moving said carriage to predetermined distances, a revolving shaft, and key-controlled means for throwing said parts into action by means of said shaft.

16. In an adding and recording machine, adding-wheels and printing mechanism, rack and lever means for producing a variable movement of said wheels and printing mechanism, a carriage for the paper and means for producing a variable movement thereof, cams and friction-clutches to actuate said rack and lever means and said carriage-operating means, key-controlling means for said clutches, and power means for driving said clutches.

17. In an adding and recording machine, adding-wheels and printing mechanism, automatic means for operating said wheels and printing mechanism, and a series of keys adapted to throw said means into action, in combination with a movable carriage for the paper, automatic means for setting said carriage at predetermined places, and keys for throwing said means into action.

18. In an adding and recording machine, adding mechanism for the totals, and printing mechanism for the items, power means providing variable actuation of said mechanism, and a series of selector-keys for throwing said power means into action, in combination with a movable carriage for the paper, automatic means for setting said carriage at predetermined places, and a series of selector-keys for throwing said means into action.

19. In an adding and recording machine, adding mechanism and power means for automatically operating said mechanism, and keys to throw said power means into action, in combination with a movable carriage for the paper, means to automatically move said carriage in opposite directions, and selector-keys for determining the movement of said carriage.

20. In an adding and recording machine, adding-wheels and printing mechanism, means for operating said wheels and mechanism, and a series of selector-keys for said wheels and printing mechanism adapted to throw said means into action, in combination with a carriage for the paper, means to move said carriage, a series of selector-keys to control the movement of said carriage, and locking means for the adding-wheel and printing-mechanism keys having operative connections with said carriage.

21. In an adding and recording machine, adding-wheels and a slidable item-printing type-bar and hammers for said wheels and bar, a variable-throw mechanism for actuating said wheels and said bar varying distances, a series of levers and clutch and cam members for said variable-throw mechanism, a power-shaft to operate said clutches, and selector-keys to throw said clutches into action.

22. In an adding and recording machine, adding-wheels and a slidable item type-bar and printing-hammers opposite thereto, a variable-throw mechanism for actuating said wheels and said bar, a series of levers and clutch and cam members for said mechanism, a power-shaft to operate said clutches and selector-keys to throw said clutches, in combination with a carriage for the paper, stops to limit the movement of said carriage, means to actuate said carriage, clutch and cam members to operate said stops and said carriage-actuating means, a driven shaft for said clutches, and selector-keys to throw said clutches into action.

In testimony whereof I sign this specification in the presence of two witnesses.

ADOLPHUS S. DENNIS.

Witnesses:
C. A. SELL,
R. B. MOSER.